(12) United States Patent
Diamond et al.

(10) Patent No.: US 12,723,418 B2
(45) Date of Patent: Sep. 1, 2026

(54) PASSENGER MOTOR VEHICLE CONFIGURED TO PERFORM ADDITIVE MANUFACTURING OPERATIONS

(71) Applicant: Ford Global Technologies, LLC, Dearborn, MI (US)

(72) Inventors: Brendan Diamond, Grosse Pointe, MI (US); David Brian Glickman, Southfield, MI (US); Keith Weston, Canton, MI (US); Stuart C. Salter, White Lake, MI (US); John Robert Van Wiemeersch, Novi, MI (US); Ellen Cheng-chi Lee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1142 days.

(21) Appl. No.: 17/747,169

(22) Filed: May 18, 2022

(65) Prior Publication Data

US 2023/0374743 A1 Nov. 23, 2023

(51) Int. Cl.
*E04G 21/04* (2006.01)
*B33Y 10/00* (2015.01)
*B33Y 30/00* (2015.01)

(52) U.S. Cl.
CPC .......... *E04G 21/0463* (2013.01); *B33Y 10/00* (2014.12); *B33Y 30/00* (2014.12)

(58) Field of Classification Search
CPC ........ E01C 11/005; E01C 19/12; E01C 19/18; E01C 19/182; E04G 21/04; E04G 21/0436; E04G 21/0445; E04G 21/0463
USPC .......................................................... 404/111
See application file for complete search history.

(56) References Cited

U.S. PATENT DOCUMENTS 4,423,980 A * 1/1984 Warnock ................. E01C 23/06 404/83
4,820,078 A * 4/1989 Brocious ............... E01C 19/174 404/92
5,131,788 A * 7/1992 Hulicsko ................ E01C 23/14 404/90
5,263,790 A * 11/1993 Bickley ................... E01C 23/06 404/108
5,823,218 A * 10/1998 Schlecht ............... B66C 23/005 91/363 R
7,729,832 B2 * 6/2010 Benckert ............. E04G 21/0463 222/533

(Continued)

FOREIGN PATENT DOCUMENTS

CN 109500978 A 3/2019
WO 2020181083 A1 9/2020

OTHER PUBLICATIONS

"Mobile Robot for Large Scale 3D Printing at Construction Sites." IEEE Xplore, May 28, 2020, https://innovate.ieee.org/innovation-spotlight/large-scale-3d-printer/.

*Primary Examiner* — Gary S Hartmann
(74) *Attorney, Agent, or Firm* — Vichit Chea; Carlson, Gaskey & Olds, P.C.

(57) ABSTRACT

In some aspects, the techniques described herein relate to a passenger motor vehicle including a robotic arm configured for use in performing an additive manufacturing operation. In other aspects, the techniques described herein relate to a method including performing an additive manufacturing operation using a robotic arm mounted to a passenger motor vehicle.

10 Claims, 4 Drawing Sheets

(56) References Cited

U.S. PATENT DOCUMENTS

| | | | | |
|---|---|---|---|---|
| 8,281,811 | B2 * | 10/2012 | Rau | E04G 21/0463 340/12.51 |
| 8,308,394 | B2 * | 11/2012 | Whitley | E01C 23/06 404/101 |
| 10,478,972 | B2 * | 11/2019 | Lipinski | B05B 3/00 |
| 11,225,013 | B2 | 1/2022 | Stubler et al. | |
| 2007/0037484 | A1 * | 2/2007 | Ohishi | B08B 7/02 451/6 |
| 2012/0253612 | A1 * | 10/2012 | Byrne | E01C 19/4853 404/133.05 |
| 2016/0032540 | A1 * | 2/2016 | Reda | E01C 19/185 404/75 |
| 2017/0106568 | A1 * | 4/2017 | Keating | E04C 5/168 |
| 2023/0129688 | A1 * | 4/2023 | Pucella | E04G 21/202 |

* cited by examiner

10

76
36
68
72
74
70
66
38

10
38
82
78
80
84
86

PASSENGER MOTOR VEHICLE CONFIGURED TO PERFORM ADDITIVE MANUFACTURING OPERATIONS

TECHNICAL FIELD

This disclosure relates to a passenger motor vehicle configured to perform additive manufacturing operations.

BACKGROUND

Some vehicles, such as pickup trucks, include a cargo bed. The cargo bed is typically located behind a passenger compartment of the vehicle. A tailgate can enclose a rear, or aft, end of the cargo bed. Users use cargo beds to carry various types of loads and/or cargo.

SUMMARY

In some aspects, the techniques described herein relate to a passenger motor vehicle, including: a robotic arm configured for use in performing an additive manufacturing operation.

In some aspects, the techniques described herein relate to a passenger motor vehicle, wherein: the passenger motor vehicle is a pickup truck including a cargo area, and the robotic arm is mounted adjacent the cargo area.

In some aspects, the techniques described herein relate to a passenger motor vehicle, wherein: the passenger motor vehicle includes a track system including at least one track, the track system is adjacent the cargo area, and the robotic arm is mounted to the track and is configured to selectively slide along the track in at least one direction.

In some aspects, the techniques described herein relate to a passenger motor vehicle, wherein the at least one direction includes a direction perpendicular to a centerline of the passenger motor vehicle.

In some aspects, the techniques described herein relate to a passenger motor vehicle, further including: a controller; wherein the controller is configured to be programmed with instructions for carrying out an additive manufacturing operation, and the controller is further configured to issue commands to the robotic arm and the passenger motor vehicle to perform the additive manufacturing operation.

In some aspects, the techniques described herein relate to a passenger motor vehicle, further including: a plurality of sensors; wherein the controller is configured to issue one or more of the following commands, based on the instructions and the information from the plurality of sensors, to perform the additive manufacturing operation: to move the robotic arm, to slide the robotic arm long the at least one track, and to move the passenger motor vehicle.

In some aspects, the techniques described herein relate to a passenger motor vehicle, wherein: the controller is configured to use information from at least one of the plurality of sensors to identify a pothole in a road surface, and the controller is configured to issue one or more commands to cause the passenger motor vehicle to fill the pothole.

In some aspects, the techniques described herein relate to a passenger motor vehicle, wherein the controller is configured to issue one or more commands to cause the passenger motor vehicle to deposit concrete or mortar.

In some aspects, the techniques described herein relate to a passenger motor vehicle, further including a source of additive manufacturing material within the cargo area.

In some aspects, the techniques described herein relate to a passenger motor vehicle, wherein the passenger motor vehicle is connected to a trailer including a source of additive manufacturing material.

In some aspects, the techniques described herein relate to a passenger motor vehicle, further including a passenger cabin forward of the cargo area.

In some aspects, the techniques described herein relate to a passenger motor vehicle, wherein the passenger motor vehicle is a fully autonomous vehicle.

In some aspects, the techniques described herein relate to a passenger motor vehicle, wherein the robotic arm is powered by a power source of the passenger motor vehicle.

In some aspects, the techniques described herein relate to a method, including: performing an additive manufacturing operation using a robotic arm mounted to a passenger motor vehicle.

In some aspects, the techniques described herein relate to a method, wherein: the additive manufacturing operation includes depositing mortar, and the method further includes depositing bricks on the deposited mortar using another robotic arm mounted to another vehicle.

In some aspects, the techniques described herein relate to a method, wherein the additive manufacturing operation includes filling a pothole in a road surface.

In some aspects, the techniques described herein relate to a method, wherein the additive manufacturing operation includes depositing multiple layers of concrete to form a concrete structure.

In some aspects, the techniques described herein relate to a method, further including: adjusting a position of the robotic arm based on a command from a controller of the passenger motor vehicle, wherein the controller is configured to issue commands based on instructions for the additive manufacturing operation and based on information at least one of a plurality vehicle sensors.

In some aspects, the techniques described herein relate to a method, further including: sliding the robotic arm along a track mounted to the passenger motor vehicle in at least a direction perpendicular to a centerline of the motor vehicle.

In some aspects, the techniques described herein relate to a method, further including causing additive manufacturing material to flow from a source to the robotic arm during the additive manufacturing operation, and wherein the source is within a cargo area of the passenger motor vehicle or a trailer towed by the passenger motor vehicle.

DETAILED DESCRIPTION

This disclosure relates to a passenger motor vehicle configured to perform additive manufacturing operations. The passenger motor vehicle is especially suited to perform various construction operations, including building various objects (such as concrete structures), laying mortar, and/or filling potholes. The passenger motor vehicle can perform at least some steps of these operations automatically, without requiring constant manual inputs of a human operator. As such, the passenger motor vehicle is particularly useful for various construction applications. Additional benefits will be appreciated from a review of the below description.

Figure 1:
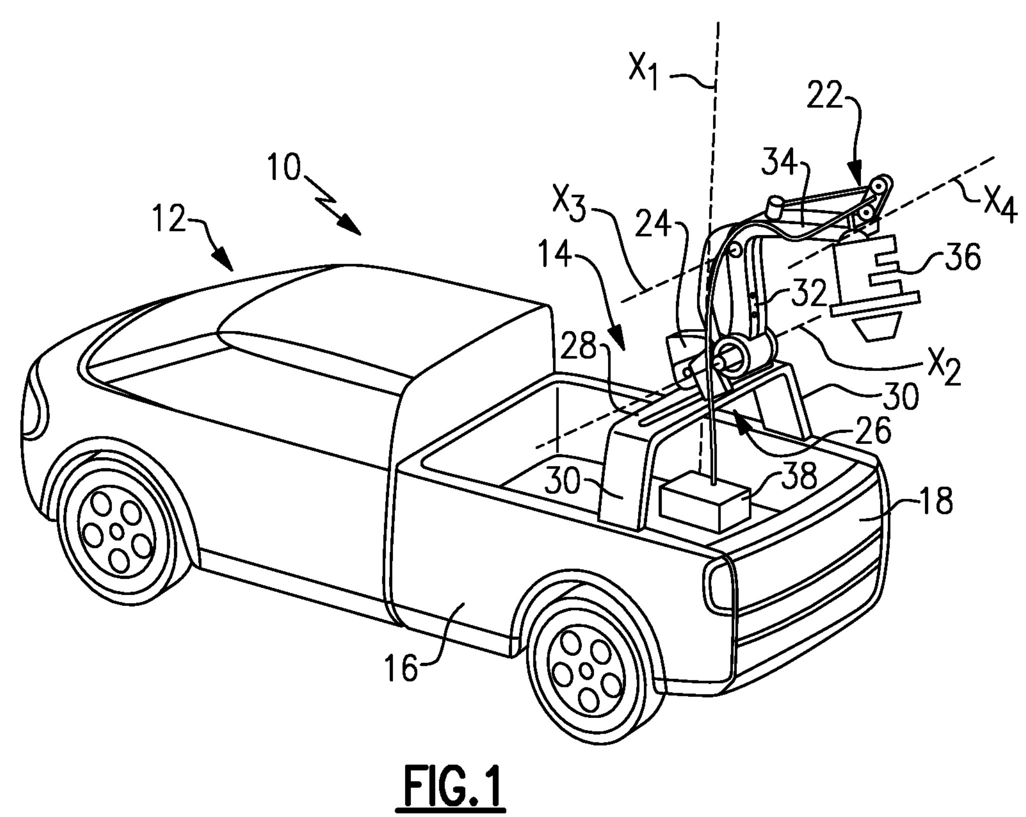
FIG. 1 is a perspective view of an example passenger motor vehicle including a robotic arm.

Referring to the drawings, FIG. 1 schematically illustrates an example passenger motor vehicle 10 ("vehicle 10") according to this disclosure. The term passenger motor vehicle is used herein to refer to motor vehicles that are designed and configured for the transportation of human passengers. Indeed, in this example, the vehicle 10 includes a passenger cabin, or compartment, 12 configured to permit one or more human passengers to sit in the vehicle 10. The term passenger motor vehicle does not refer to robotic vehicles that are not able to transport human passengers.

The vehicle 10 in this example is a pickup truck. This disclosure extends to other vehicle types, however. The vehicle 10 includes a cargo area 14 rearward of the passenger cabin 12. The cargo area 14 is laterally bound by sides 16 and at a rear by a tailgate 18, which may be moveable between an open and closed position. The base of the cargo area 14 may be referred to as a bed.

The vehicle 10 is an electrified vehicle, such as a battery electric vehicle (BEV) or plug-in hybrid vehicle (PHEV). The vehicle 10 includes a traction battery 20 (FIG. 2), which may be referred to as an electric vehicle battery or battery pack, configured to power electric motors that, in turn, turn wheels that drive the vehicle 10. The vehicle 10 is also configured to direct power from the traction battery 20 to one or more accessories, such as the robotic arm 22. While an electrified vehicle is mentioned, the vehicle 10 may be powered by an internal combustion engine. In that case, the internal combustion engine would be configured to power the accessories of the vehicle 10, such as the robotic arm 22. The vehicle 10 may require a human operator during driving or include a self-driving system and may be capable of level 5 operation without requiring a human operator.

As shown, the vehicle 10 includes a robotic arm 22. The robotic arm 22 is configured to assist with performing additive manufacturing operations, in this disclosure. The robotic arm 22 may be considered a multi-axis robot. The robotic arm 22 is arranged atop a base 24, which is in turn mounted to a track system 26. The track system 26, in this example, includes a track 28 extending perpendicular to a centerline of the vehicle 10. The track 28 is mounted to the cargo area 14 via legs 30, which project upward from the sides 16 in this example. One or more actuators may facilitate movement of the base 24, and in turn the robotic arm 22, along the track 28. Those actuators are powered by the traction battery 20. The legs 30 may also be moveable in a direction parallel to the centerline of the vehicle 10, along the sides 16, to provide another degree of movement of the track system 26.

The robotic arm 22 includes two arms 32, 34 mounted relative to the base 24. The arms 32, 34 support a tool 36. The tool 36, in this example, is a nozzle configured to expel additive manufacturing material. The tool 36 is fluidly coupled to a source of additive manufacturing material 38 ("source 38"), which may be in the bed of the vehicle 10. The source 38 may include or be coupled to a pump that causes the additive manufacturing material to flow to the tool 36. The pump is powered by the traction battery 20. Example additive manufacturing materials include concrete and mortar, as example. Other example materials include plastics. The source can be in the form of pellets or filament, as examples. Another example source includes metal wire. Still other example materials include composites. Further, while the tool 36 is particularly suited to fused filament fabrication (FFF), which may be referred to as material extrusion or fused deposition modeling, techniques, the tool 36 could be provided by a tool configured for use in other additive manufacturing techniques, such as wire arc additive manufacturing techniques.

The robotic arm 22 is moveable to place the tool 36 in a desired location and orientation in space, as needed for a particular step of an additive manufacturing process. The base 24 is rotatable about an axis $X_1$ extending perpendicular to a ground surface upon which the vehicle 10 sits, generally in the direction of gravity. The base 24 may be rotatable with 360° of freedom about axis $X_1$. The arm 32 is moveable relative to the base about axis $X_2$. The axis $X_2$ extends generally parallel to a ground surface. The arm 34 is moveable relative to arm 32 about axis $X_3$. Tool 36 is moveable relative to arm 34 about axis $X_4$. The robotic arm 22 may include additional or fewer axes of movement in other examples. All movements about axes $X_1$-$X_4$ may be brought about by various actuators powered by the traction battery 20.

The robotic arm 22 is moveable to position the tool 36 in response to commands from a controller 40. The controller 40 could be part of an overall vehicle control module, such as a vehicle system controller (VSC), or could alternatively be a stand-alone controller separate from the VSC. Further, the controller 40 may be programmed with executable instructions for interfacing with and operating the various components of the vehicle 10. The controller 40 includes a processing unit and non-transitory memory for executing the various control strategies and modes of the vehicle 10.

The vehicle 10 includes a plurality of sensors configured to generate signals used by the vehicle 10 to position the vehicle 10 and/or the robotic arm 22, and in turn the tool 36, in a particular location or position to carry out an additive manufacturing operation. The controller 40 is in communication with each of the sensors, is able to interpret signals from the sensors, and is able to selectively command the vehicle 10 and/or the robotic arm 22 to move to a particular location or position based on the signals.

Figure 2:
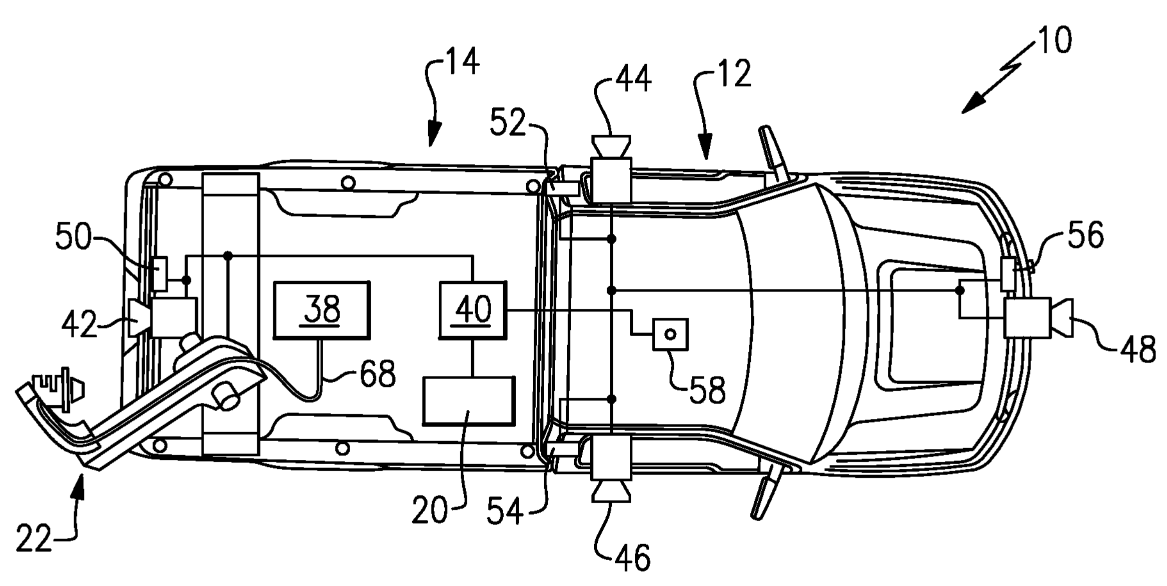
FIG. 2 is a top, schematic view of the example passenger motor vehicle.

Example sensors are shown in FIG. 2 schematically. In an example, the vehicle 10 includes first, second, third, and fourth image sensors 42, 44, 46, 48 which may be cameras. The image sensors 44, 46 are mounted to capture still images or video of activity adjacent first and second opposed sides of the vehicle 10. The image sensors 44, 46 may be integrated into a B-pillar applique of the vehicle 10. The image sensors 42, 48 are mounted to capture still images or video of activity adjacent the rear and front of the vehicle 10, respectively. The vehicle 10 may include additional sensors, including sensors 50, 52, 54, 56. The sensors 50, 52, 54, 56 may be radio detecting and imaging (RADAR) sensors, light detection and ranging (LIDAR) sensors, or ultrasonic sensors. One or more of the sensors 50, 52, 54, 56 may alternatively or additionally be provided by wireless sensors systems utilizing Bluetooth® low energy (BLE) or Ultra Wide-Band (UWB) technology, as examples. One or more of the sensors 42, 44, 46, 48, 50, 52, 54, 56 may be part of a blind spot information system (BLIS) or another type of advanced driver-assistance system (ADAS). One or more of the sensors 42, 44, 46, 48, 50, 52, 54, 56 may be a touch probe mounted to the robotic arm 22. The locations of the sensors 42, 44, 46, 48, 50, 52, 54, 56 are exemplary only. It should be understood that this disclosure extends to vehicles that have different sensor systems.

The vehicle 10 can also include a transceiver 58 configured to receive signals from a key fob, a keypad on a door of the vehicle 10 (for example), a mobile device of a user (i.e., using the phone as a key, sometimes abbreviated PaaK), an radio-frequency identification (RFID) tag, a remote server, or a button within the vehicle 10. The transceiver 58 may utilize BLE or UWB technology. The transceiver 58 may be considered a sensor. The transceiver 58 may also connect the controller 40 to the Internet. The transceiver 58 may communicate with a global positioning system (GPS). The sensors 42, 44, 46, 48, 50, 52, 54, 56 and transceiver 58 may be standard equipment on the vehicle 10 such that this disclosure largely takes advantage of existing hardware of the vehicle 10.

The controller 40 may include hardware and software that can be integrated or separated into modules. The controller 40 is able to receive or download instructions for forming a part or object, and can issue one or more commands to the robotic arm 22 and/or the vehicle 10 to cause the robotic arm 22 to assist with building that object. The controller 40 may be in communication with a CAD database. The CAD database may include, for example, three dimensional data that provides a shape of an object or part to be formed using the robotic arm 22 as well as three dimensional data of the location, including ground surface contours, of the area where the object/part is to be formed. The controller 40 is configured to interrelate the coordinate systems associated with the robotic arm 22, the vehicle 10, the dimensional information associated with the part or object to be formed, and the dimensional information of the location at which the object/part is going to be formed, which allows the coordinates of the CAD database to be used in generating the part or object to be formed. The part or object to be formed will typically be broken into multiple passes or layers of additive manufacturing material that are laid on top of one another. Various exemplary uses of the vehicle 10 will now be described with reference to FIGS. 3-5.

Figure 3:
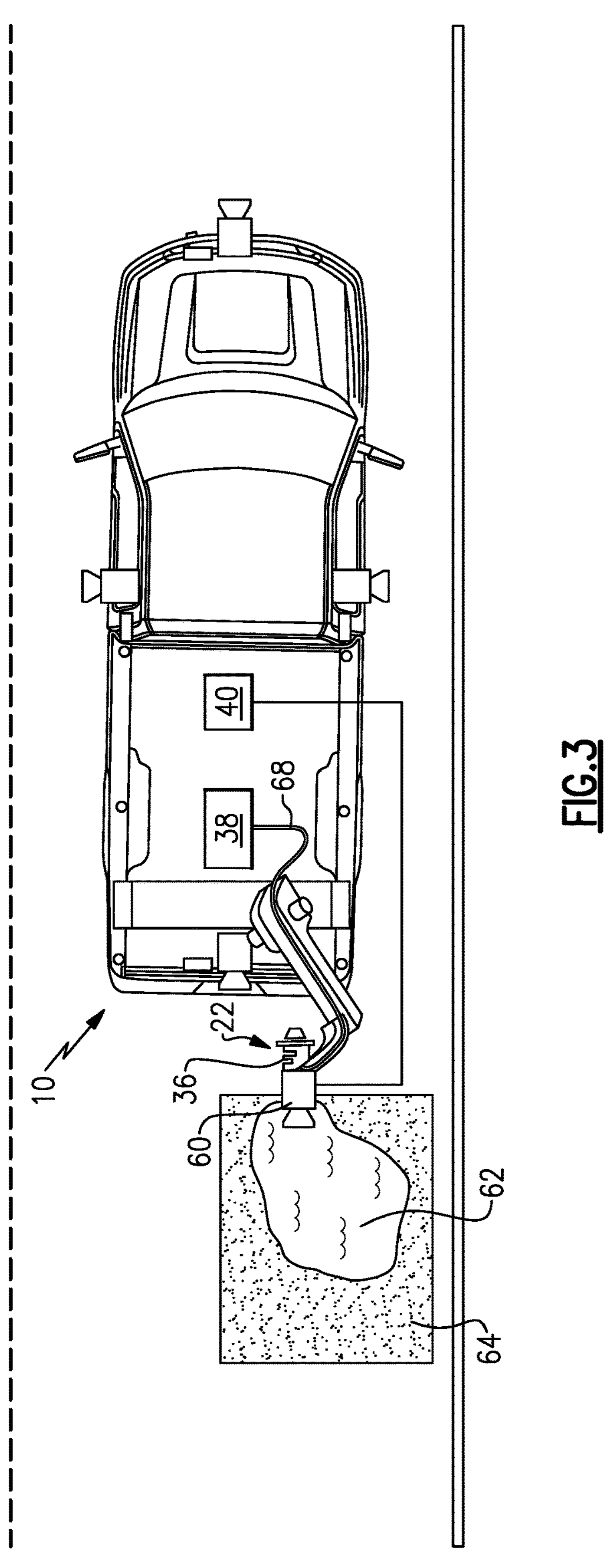
FIG. 3 illustrates the example passenger motor vehicle being used to fill a pothole.

FIG. 3 illustrates an example use case for the vehicle 10 in filling potholes. In this example, an image sensor 60 in communication with the controller 40 is mounted to the free end of the robotic arm 22 adjacent the tool 36. The controller 40 is configured to use information from the image sensor 60 to identify potholes, such as the pothole 62, in a road surface 64, and, optionally, to estimate a size of the pothole 62. The controller 40 is configured to issue one or more commands to cause the robotic arm 22 to position the tool relative to an identified pothole 62, and to cause material to flow from source 38 into the pothole 62 via the tool 36. The source 38 may be cold-patch or other known materials used to fill potholes. The controller 40 may use information from the image sensor 60 to determine whether the pothole 62 is filled and, if so, the controller 40 will issue one or more commands to cease flow of additive material. The controller 40 may use information from the image sensor 60 to determine if the state of the pothole 62 is not conducive to filling, such as if the pothole 62 is filled with water. In that case, the controller 40 may issue an instruction to a worker to dry the pothole 62. For purposes of this disclosure, filling a pothole is considered an additive manufacturing technique.

Figure 4:
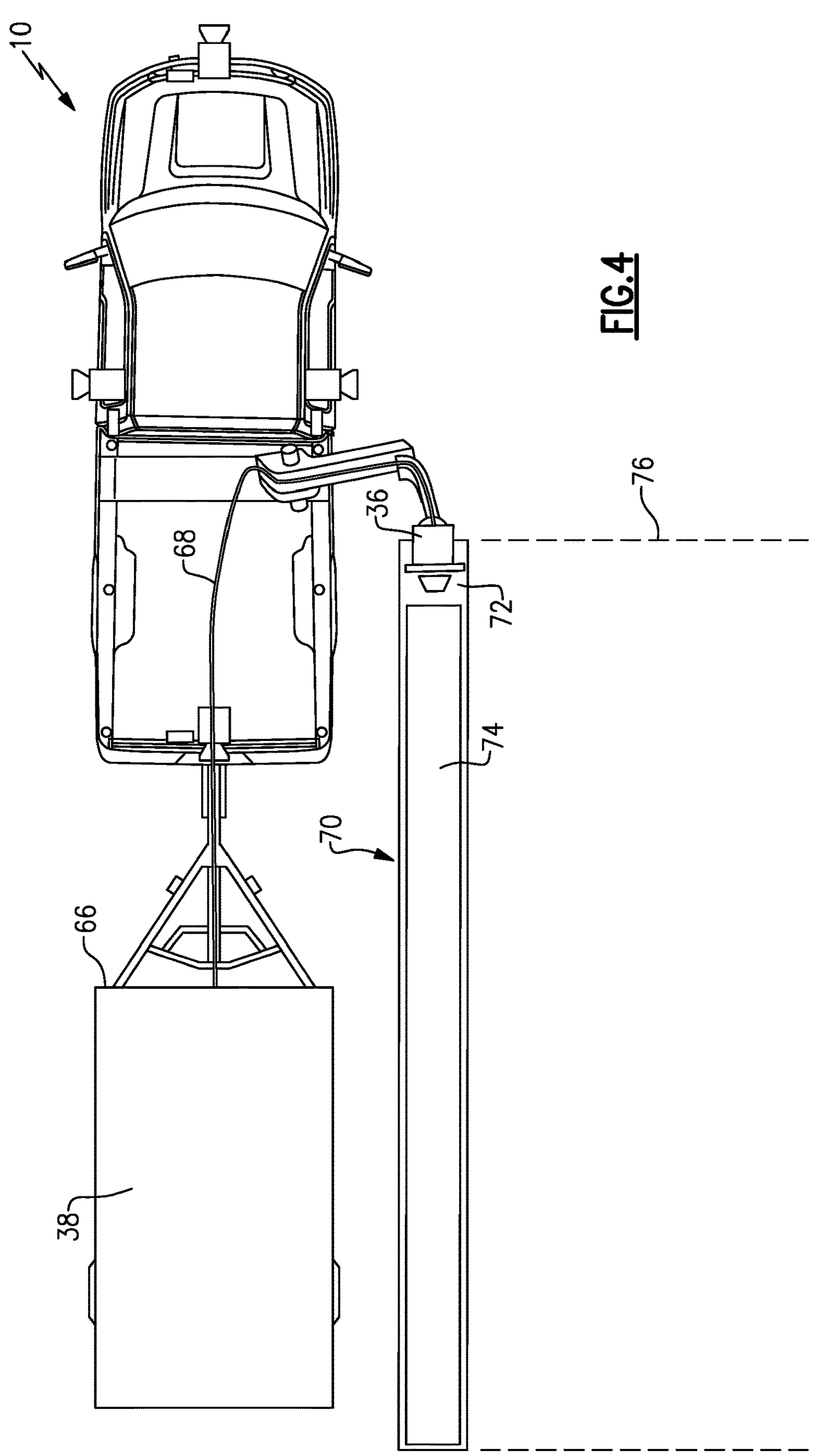
FIG. 4 illustrates the example passenger motor vehicle being used, in combination with a trailer, to build an object.

In FIGS. 1-3, the source 38 is arranged on the bed of the cargo area 14 of the vehicle 10. In FIG. 4, the source 38 is contained in or on a trailer 66, which is towed by the vehicle 10. A fluid conduit 68 runs between the trailer 66 and the robotic arm 22 and couples source 38 to the tool 36. One or more pumps and valves may cause the additive material to flow from the source 38 to the tool 36. In this example, the additive manufacturing material is concrete. The controller 40 is configured to receive instructions for building an object 70 out of concrete. The object 70 may be a wall, such as a portion of a building or other structure. The controller 40 is configured to receive instructions, such as plans, for building the object 70, and can issue commands to the vehicle 10 and/or the robotic arm 22 to lay layers of concrete on one another to build the object 70. In FIG. 4, a first layer 72 has at least partially dried and a second layer 74 is being laid on top of the first layer. The process continues until the object 70 is complete. A build area 76 is shown in dashed lines. When the object 70, which again may be a wall, is complete additional objects, such as adjacent walls or other structures, may be built in the build area 76, as dictated by the instructions that are provided to the controller 40. The controller 40 may command the vehicle 10 to move to another location adjacent the build area 76 to build the additional objects after the object 70 is completed.

Whether the source 38 is within the bed of the vehicle 10 or towed in a trailer 66, the controller 40 may be in communication with one or more sensors to determine the level of material within the source 38 and to take one or more actions when a low level is identified, such as issuing an alert to a user to fill additional material, estimating whether a particular task can be performed and/or completed based on current levels, etc. The controller 40 may issue an alert indicating an estimated time until the source 38 is empty and/or a request for a user to refill the source 38. The controller 40 may also issue an alert if a clog or blockage is identified in any conduits, pumps, valves used to connect the source 38 to the tool 36. The alerts can take the form of messages pushed to a mobile device of a user or an interface of the vehicle 10.

Figure 5:
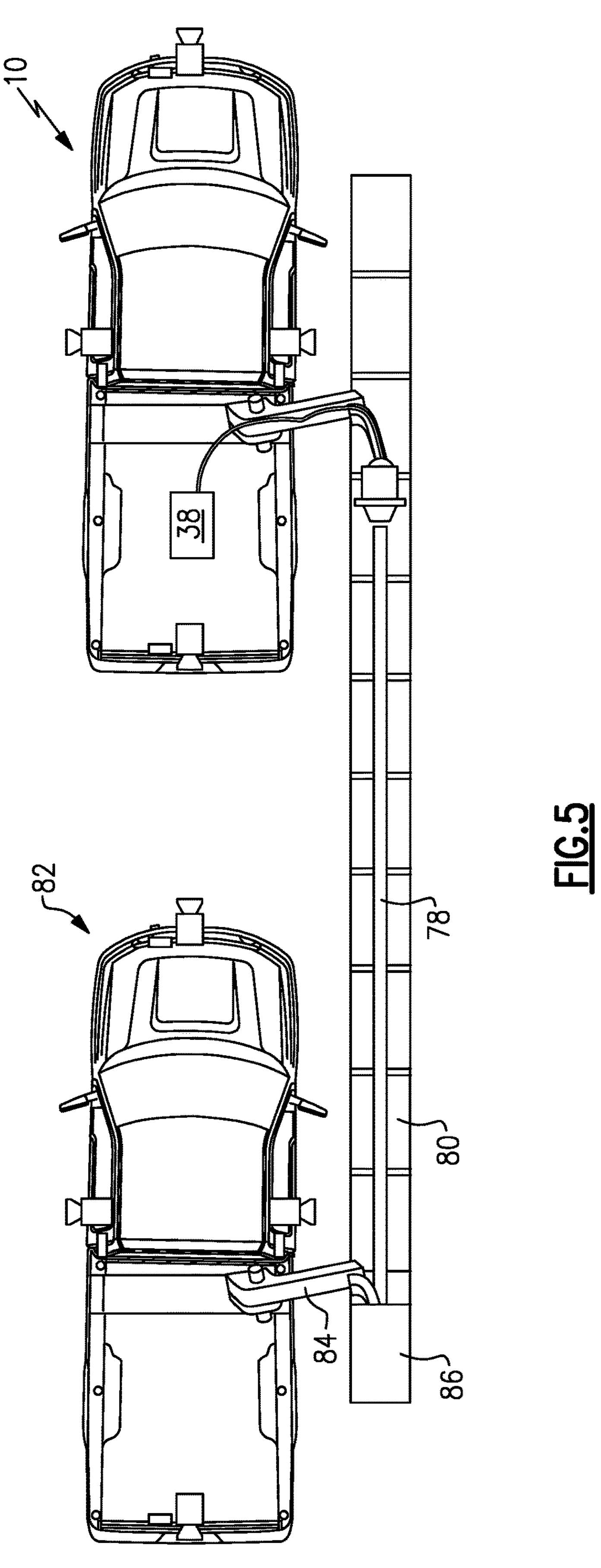
FIG. 5 illustrates the example passenger motor vehicle being used, in combination with another vehicle, to lay mortar as part of a brick laying process.

FIG. 5 illustrates another example use case. In FIG. 5, the robotic arm 22 is used to lay down mortar 78 on top of a layer 80 of bricks. The vehicle 10 is a first vehicle in a two-vehicle system. The second vehicle 82 is configured with a robotic arm 84 having a tool configured to lay bricks 86 on the mortar 78 deposited by the vehicle 10. The vehicles 10, 82 may communicate with one another. The controller 40 of vehicle 10 may issue one or more commands to the vehicle 82. Both vehicles 10, 82 may use information from their sensors to determine whether various tasks are being performed as expected, whether the robotic arms are moving in a correct location in space, etc. Additional vehicles can work together to reduce build times in any of the above-discussed embodiments. Further, while FIGS. 3-5 show various use cases, the vehicle 10 could be used in additional applications, including installing fenceposts, highway mile markers, caulking windows or doors of a building, printing insulating foam, building objects such as tables, tools, etc.

One aspect of this disclosure relates to adjustments made by the controller 40 during an additive manufacturing process. As an object is being built, the controller 40 can use information from any of the above-discussed sensors to determine the status of the process. The controller 40, in one example, makes adjustments to the position of the robotic arm 22 and tool 36 as the effective weight of the vehicle 10 decreases due to the gradual reduction in weight of the source 38 as the additive manufacturing material is used during an additive manufacturing process. In turn, there may be a gradual rise in vehicle 10 ride height as weight on the suspension is reduced. The controller 40 is configured to make those adjustments such that the robotic arm 22 and tool 36 are positioned appropriately in space. The controller 40 is also configured to adjust the suspension to account for uneven ground surfaces. In a particular example, the controller 40 adjusts the air suspension system of the vehicle 10 to ensure the cargo area 14, and in particular the bed, remains substantially flat relative to a ground surface and/or a build site during a build operation.

The controller 40 is also configured to plan an additive manufacturing process based on one or more factors. The controller 40 is configured to receive information about the weather in a location of an anticipated additive manufacturing process, including humidity and temperature. The controller 40 may determine that the source 38 needs to be preheated before a particular additive manufacturing process can begin. In this regard, the source 38 may be adjacent a heater selectively controlled by the controller 40. The controller 40 may also determine a sequence of steps based on one or more environmental conditions. In an example, the controller 40 is configured to receive a weather report and will not begin an additive manufacturing process if the process cannot be completed before adverse weather is expected to begin. The controller 40 may also use the sensors of the vehicle 10 to scan the worksite for debris or any other potential encumbrance to an additive manufacturing process. The controller 40 may also determine a speed at which material is expelled from the tool 36, and make adjustments to the speed if necessary, based on one or more factors, including environmental factors, desired resolution of the object being built, etc.

A drone can be used and can communicate with the vehicle 10, and specifically the controller 40, to inspect built objects. In response to information from the drone, the controller 40 could issue commands that cause the vehicle 10 to perform various finishing touches on an object. Instead of or in addition to a drone, the sensors of the vehicle 10 could perform the inspection. The vehicle 10 and the corresponding sensors, 42, 44, 46, 48, 50, 52, 54, 56, can also inspect a building site before, during, and/or after a building operation. The controller 40 can use this information to plan where the vehicle 10 needs to drive during a build operation to complete the operation, and to ensure the area is free of debris such that the vehicle 10 can drive where needed. The controller 40 can also use the information from the sensors to plan adjustments to the suspension of the vehicle 10 during the build operation to ensure a substantially flat cargo area 14 during the build operation. The controller 40 can also use the information to ensure proper pre-work, if any is required, has been completed before beginning a build operation.

It should be understood that terms such as "about," "substantially," and "generally" are not intended to be boundaryless terms, and should be interpreted consistent with the way one skilled in the art would interpret those terms. Further, directional terms such as "forward," "rearward," "upward," "downward," "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A passenger motor vehicle, comprising:

a robotic arm configured for use in performing an additive manufacturing operation, wherein the passenger motor vehicle is a pickup truck including a passenger cabin forward of a cargo area, wherein the cargo area includes a bed, a first side and a second side on an opposite lateral side of the bed as the first side, and a tailgate arranged adjacent a rear of the bed, wherein the robotic arm is mounted adjacent the cargo area, wherein the passenger motor vehicle includes a track system including at least one track, wherein the track system is adjacent the cargo area and is slidable along the first side of the cargo area and the second side of the cargo area in a first direction substantially parallel to a centerline of the passenger motor vehicle, and wherein the robotic arm is mounted to the track and is slidable along the track in a second direction substantially perpendicular to the first direction.

2. The passenger motor vehicle as recited in claim 1, further comprising:

a controller;

wherein the controller is configured to be programmed with instructions for carrying out an additive manufacturing operation, and the controller is further configured to issue commands to the robotic arm and the passenger motor vehicle to perform the additive manufacturing operation.

3. The passenger motor vehicle as recited in claim 2, further comprising:

a plurality of sensors;

wherein, based on the instructions and information from the plurality of sensors, the controller is configured to issue one or more commands to perform the additive manufacturing operation selected from a list of: moving the robotic arm, sliding the robotic arm along the at least one track, and moving the passenger motor vehicle.

4. The passenger motor vehicle as recited in claim 3, wherein the controller is configured to issue one or more commands to cause the passenger motor vehicle to deposit concrete or mortar.

5. The passenger motor vehicle as recited in claim 1, wherein the passenger motor vehicle is connected to a trailer including a source of additive manufacturing material.

6. The passenger motor vehicle as recited in claim 1, wherein the passenger motor vehicle is a fully autonomous vehicle.

7. The passenger motor vehicle as recited in claim 1, wherein the robotic arm is powered by a power source of the passenger motor vehicle.

8. The passenger motor vehicle as recited in claim 1, wherein:

the track system includes a first arm projecting upward from the first side, the track system includes a second arm projecting upward from the second side, and the track is supported by the first arm and the second arm.

9. The passenger motor vehicle as recited in claim 8, further comprising a source of additive manufacturing material located within the cargo area and vertically below the track.

10. A passenger motor vehicle, comprising:

a robotic arm configured for use in performing an additive manufacturing operation;

at least one sensor; and a controller configured to use information from the at least one sensor to identify a pothole in a road surface, wherein the controller is configured to issue one or more commands to cause the passenger motor vehicle to fill the pothole by orienting the robotic arm relative to the pothole and causing material to be expelled from a nozzle mounted to the robotic arm and into the pothole, wherein the robotic arm is mounted adjacent a cargo area of the motor vehicle, wherein the passenger motor vehicle includes a track system including at least one track, wherein the track system is adjacent the cargo area, wherein the robotic arm is mounted to the track and is slidable along the track, wherein the robotic arm is mounted to the track via a base, and wherein the base is rotatable with 360° freedom of rotation relative to the track and about an axis extending perpendicular to a ground surface adjacent the passenger motor vehicle.

* * * * *